(12) United States Patent
Kim (10) Patent No.: US 11,172,804 B2
(45) Date of Patent: Nov. 16, 2021

(54) DISH WASHER AND WASHING METHOD USING THE SAME

(71) Applicant: Wu Il Kim, Seoul (KR)

(72) Inventor: Wu Il Kim, Seoul (KR)

( * ) Notice: Subject to any disclaimer, the term of this patent is extended or adjusted under 35 U.S.C. 154(b) by 29 days.

(21) Appl. No.: 16/825,133

(22) Filed: Mar. 20, 2020

(65) Prior Publication Data

US 2021/0015337 A1    Jan. 21, 2021

(30) Foreign Application Priority Data

Jul. 16, 2019    (KR) .......................... 10-2019-0085864

(51) Int. Cl.
*A47L 15/42*  (2006.01)
*A47L 15/23*  (2006.01)

(52) U.S. Cl.
CPC ....... *A47L 15/4221* (2013.01); *A47L 15/4225* (2013.01); *A47L 15/23* (2013.01); *A47L 2401/20* (2013.01); *A47L 2501/03* (2013.01); *A47L 2501/30* (2013.01); *A47L 2601/04* (2013.01)

(58) Field of Classification Search
CPC .. A47L 15/4221; A47L 15/4225; A47L 15/50; A47L 2401/20; A47L 2501/30; A47L 2601/04; A47L 15/502; A47L 15/23; A47L 15/30; A47L 2501/03
See application file for complete search history.

(56) References Cited

U.S. PATENT DOCUMENTS

| | | | | |
|---|---|---|---|---|
| 1,927,665 A | * | 9/1933 | Kirby ..................... | A47L 15/22 134/111 |
| 2,501,887 A | * | 3/1950 | Cress ..................... | A47L 15/30 134/148 |
| 2,543,993 A | * | 3/1951 | Stanitz ................... | A47L 15/06 134/141 |
| 2,641,268 A | * | 6/1953 | Hellyer .................. | A47L 15/22 134/112 |
| 2,747,589 A | * | 5/1956 | Cicero .................... | A47L 15/04 134/96.1 |
| 2,842,161 A | * | 7/1958 | Hunter ................. | A47L 15/0089 137/576 |
| 3,035,706 A | * | 5/1962 | Lee ........................ | A47L 15/50 211/41.8 |
| 3,103,940 A | * | 9/1963 | Cane ...................... | A47L 15/30 134/140 |
| 3,114,375 A | * | 12/1963 | Blanchard ........... | A47L 15/0089 134/138 |

(Continued)

FOREIGN PATENT DOCUMENTS

KR    10-2013-0096926 A    9/2013

*Primary Examiner* — Benjamin L Osterhout
(74) *Attorney, Agent, or Firm* — Novick, Kim & Lee, PLLC; Jae Youn Kim (57) ABSTRACT

A dish washer and a washing method using the dish washer. As an inner washing tub is rotated in a state where a dish or a cooking utensil is accommodated in a receiving space such that a food side thereof faces an outer circumference of an inner washing tub, food residues are detached from the dish or the cooking utensil by a centrifugal force and thus the dish or the cooking utensil is efficiently washed. The configuration for generating a high-pressure water current is not required, so that it is possible to produce products at low cost, and the configuration is relatively simple, so that it is possible to produce products having various sizes.

4 Claims, 11 Drawing Sheets

(56) References Cited

U.S. PATENT DOCUMENTS

| | | | | |
|---|---|---|---|---|
| 3,126,900 A * | 3/1964 | Zane et al. | ............... | A47L 15/32 |
| | | | | 134/148 |
| 3,179,307 A * | 4/1965 | Duncan | ............... | A47L 15/4225 |
| | | | | 134/140 |
| 3,310,243 A * | 3/1967 | Duncan | ............... | A47L 15/4227 |
| | | | | 241/101.5 |
| 4,610,368 A * | 9/1986 | Hasebe | ................ | A47L 15/502 |
| | | | | 220/23.8 |
| 2003/0209548 A1 * | 11/2003 | Phifer | ................... | A47L 15/502 |
| | | | | 220/486 |
| 2008/0156358 A1 * | 7/2008 | Shin | ..................... | A47L 15/502 |
| | | | | 134/137 |

* cited by examiner

DISH WASHER AND WASHING METHOD USING THE SAME

CROSS-REFERENCE TO RELATED APPLICATION

This application claims under 35 U.S.C. § 119(a) the benefit of Korean Patent Application No. 10-2019-0085864 filed on 16 Jul. 2019, the entire contents of which are incorporated herein by reference.

BACKGROUND

(a) Technical Field

The present invention relates to a dish washer and a washing method using the dish washer. More particularly, the invention relates to a dish washer and a washing method using the dish washer, which are capable of washing dishes and cooking utensils using a centrifugal force.

(b) Background Art

Generally, after using bowls, cups, pots, frying pans, spoons and chopsticks, people wash them by hand. However, it takes a long time to wash the dishes because a rough washing operation for removing food residues from cooking utensils and dishes and a main washing operation for washing the dishes with detergent and rinsing the dishes with clean water should be performed whenever food is prepared or eaten.

Furthermore, when people directly continue washing the dishes, there is a high risk of causing dermatitis called housewife's eczema due to a prolonged contact with water or detergent, and water or detergent may be wasted.

In order to solve the problems, kitchen appliances that may automatically wash and dry various kinds of dishes, namely, dish washers have been proposed. The dish washer is usually operated according to the principle of washing a bowl with a strong water current in the state where the bowl is soaked in hot steam (including the detergent) to remove food residues from the bowl. The performance of the dish washer is evaluated based on how compactly the high-pressure water current is sprayed to wash food residues off.

However, in order to thoroughly wash the dishes through the high-pressure water current, many components should be installed in the dish washer. This undesirably increases manufacturing cost and the size of a product. As the related art, Korean Patent Publication No. 10-2013-0096926 (2 Sep. 2013) has been proposed.

SUMMARY OF THE DISCLOSURE

The present invention has been made to solve the above-mentioned problems and difficulties and relates to a dish washer and a washing method using the dish washer, which are capable of efficiently washing dishes and cooking utensils while producing various sizes of products at low cost.

According to one aspect of the invention, the present invention provides a dish washer including an inner washing tub that is open at a top thereof and has a plurality of receiving spaces to accommodate dishes and cooking utensils therein, with a plurality of perforations being formed through an outer circumference and a bottom of the inner washing tub; an outer washing tub provided to surround the inner washing tub; a motor rotating the inner washing tub leftwards or rightwards; and a plurality of dishes and cooking utensils forming one set with the dish washer, dedicated for the dish washer, and each having a size to be tightly fitted into each receiving space, each of the dishes and cooking utensils being accommodated in each receiving space and washed in a fixed state without being rotated, wherein each receiving space may be designed to correspond to a size of each of the dishes and cooking utensils and accommodate one of the dishes and cooking utensils, thus preventing the dishes and the cooking utensils from colliding with each other in a washing operation and separating the dishes and the cooking utensils by a partition plate, each of the inner washing tub and the partition plate may be made of a cushioning material, and the inner washing tub may rotate while accommodating each of the dishes and the cooking utensils in each receiving space such that a food side thereof faces an outer circumference of the inner washing tub, so that food residues are discharged to an outside of the inner washing tub by a centrifugal force, wherein the partition plate may include a plurality of first partition plates that have a plate shape and are provided radially around a center of the inner washing tub, and at least one second partition plate having a shape of a tub that is open at a top and a bottom thereof and provided inside the inner washing tub, and wherein a plurality of perforations may be formed through outer circumferences of the first partition plate and the second partition plate, and each of the dishes and cooking utensils may be accommodated through tight fitting in each receiving space defined by the first partition plate and the second partition plate.

According to the present invention, as an inner washing tub is rotated in a state where a dish or a cooking utensil is accommodated in a receiving space such that a food side thereof faces an outer circumference of an inner washing tub, food residues are detached from the dish or the cooking utensil by a centrifugal force and thus the dish or the cooking utensil is efficiently washed. As opposed to the related art, the configuration for generating a high-pressure water current is not required, so that it is possible to produce products at low cost, and the configuration is relatively simple, so that it is possible to produce products having various sizes.

Furthermore, one of dishes and cooking utensils is accommodated in each receiving space, and each of the dishes and cooking utensils accommodated in the receiving space is surrounded by an inner washing tub and a partition plate made of a cushioning material, so that there is no collision even if the inner washing tub is rotated, thus allowing the dishes and the cooking utensils to be effectively washed without damaging the dishes and the cooking utensils.

DETAILED DESCRIPTION

Hereinafter, a dish washer and a washing method using the dish washer of the present invention will be described in detail with reference to FIGS. 1 to 11.

Figure 1:
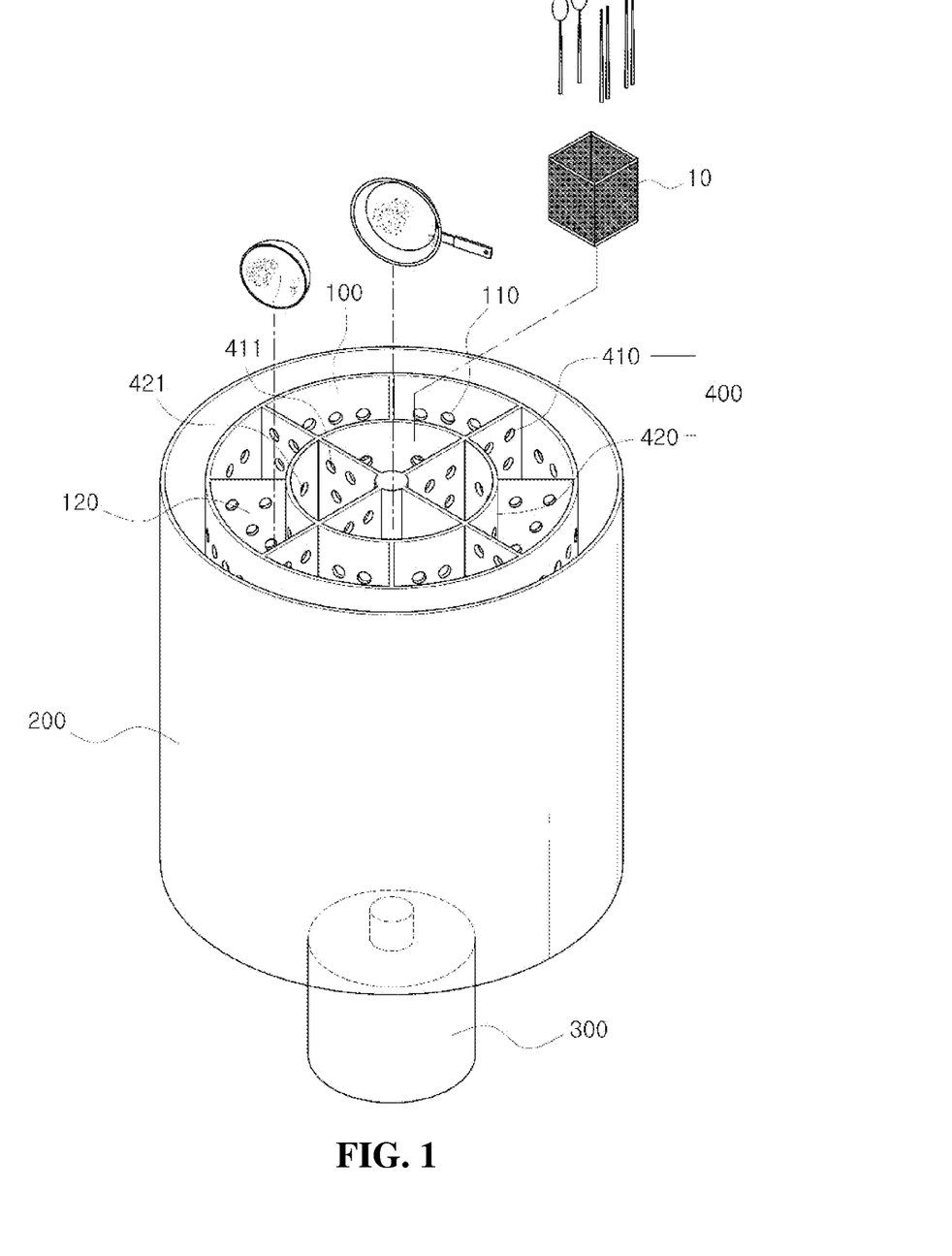
FIG. 1 is a perspective view illustrating an entire structure of a dish washer in accordance with the present invention.
Figure 2:
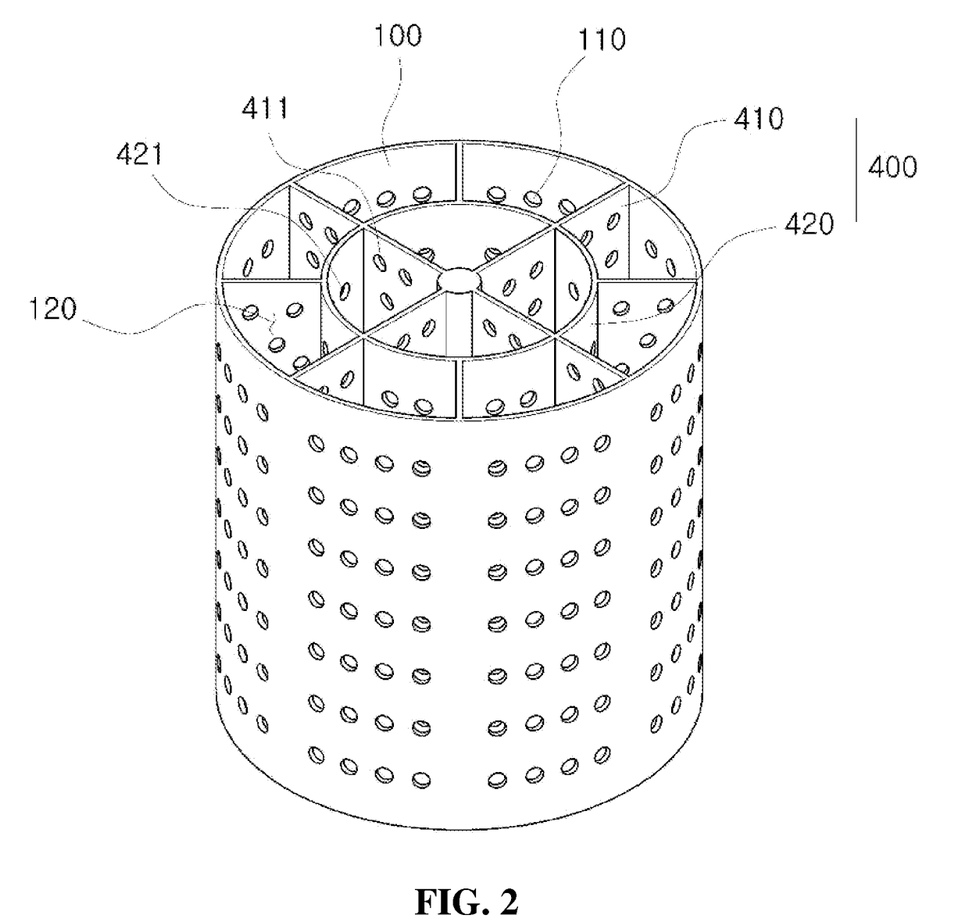
FIG. 2 is a perspective view illustrating a structure of an inner washing tub in accordance with the present invention.

First, as illustrated in FIGS. 1 and 2, the dish washer according to the present invention includes an inner washing tub 100, an outer washing tub 200, and a motor 300. Dishes and cooking utensils that are washed by the dish washer form a set with the dish washer. The dishes and cooking utensils and the dish washer are sold together to consumers as the essential components of the present invention. The dishes and the cooking utensils may be dedicated products each having a size that may be tightly fitted into each receiving space 120 of the dish washer. Each dish or cooking utensil is accommodated in each receiving space 120 and then washed in a fixed state without being rotated.

Furthermore, the dishes and the cooking utensils mentioned below mean cooking utensils used to make food, such as pots, frying pans, ladles, slices, or spatulas, bowls and cups in which food is put, and spoons and chopsticks that are used for eating food.

The inner washing tub 100 has the shape of a tub that is empty therein and is open at a top thereof, and is configured such that dishes and cooking utensils that are to be washed are put into the tub through the open top and dishes and cooking utensils that have been washed are taken out from the tub. Although the longitudinal section of the inner washing tub 100 may have a polygonal shape, it is preferable that the longitudinal section of the inner washing tub have a circular shape to make it easy to rotate the inner washing tub 100 and to discharge water/food residues.

As illustrated in FIGS. 1 to 4, the inner washing tub 100 has a plurality of perforations 110 that are formed through an outer circumference and a bottom of the tub, so that water is introduced into the inner washing tub 100 or discharged out from the inner washing tub 100 through the perforations 110 in the washing process, and food residues attached to the dishes and the cooking utensils are discharged out from the inner washing tub 100.

The outer washing tub 200 has the shape of a tub that is empty therein and is larger than the inner washing tub 100, and is provided to surround an outside of the inner washing tub 100. Although the outer washing tub 200 may have various shapes, it is preferable that the top of the outer washing tub be open and the longitudinal section of the outer washing tub have a circular shape, similarly to the inner washing tub 100. Further, the outer washing tub 200 is provided to surround the inner washing tub 100 while being spaced apart from the side and the bottom of the inner washing tub 100.

Although not shown in the drawings, a supply pipe that supplies water for washing and a discharge pipe that discharges water used for washing may be connected to the outer washing tub 200. A detergent pipe may be provided to separately supply detergent used for washing.

The motor 300 may rotate the inner washing tub 100 leftwards or rightwards. For example, a rotating shaft of the motor 300 may be coupled to a center of a bottom or a top of the inner washing tub 100. Furthermore, the motor 300 may be provided between the inner washing tub 100 and the outer washing tub 200. However, since water is put into the outer washing tub 200, the motor is preferably provided outside of the outer washing tub 200. Furthermore, the motor 300 may be rotated only in either of a left direction or a right direction. However, it is preferable that the motor be alternately rotated leftwards or rightwards to ensure efficient washing.

As the inner washing tub 100 is rotated by the motor 300, water collides with the dishes and the cooking utensils accommodated in the inner washing tub 100 due to the rotation, so that food residues may fall from the dishes and the cooking utensils, and the food residues and water covered on the dishes and the cooking utensils may be separated from the dishes and the cooking utensils by the centrifugal force.

As illustrated in FIGS. 1 and 2, the inner washing tub 100 of the present invention is partitioned by partition plates 400 into a plurality of receiving spaces 120 that individually accommodate the dishes and the cooking utensils. Each of the receiving spaces 120 partitioned by the partition plates 400 is designed to correspond to the size of the dishes and the cooking utensils. Each of the dishes and cooking utensils and each of the receiving spaces 120 are marked with numbers. For instance, any specific bowl and the receiving space 120 designed to correspond to the size of the bowl are marked with the same number.

In addition, one of the dishes and cooking utensils is accommodated in each receiving space 120, thus preventing the dishes and cooking utensils from colliding with each other in a washing operation.

Relatively large dishes and cooking utensils, such as a bowl, a cup, a pot, a frying pan, a lid, or a rice cooker container, are accommodated one by one in each of the receiving spaces 120 defined by the partition plates 400. When the dishes and cooking utensils are accommodated in the receiving spaces, they are preferably fixed.

Here, the receiving spaces 120 may vary in size depending on the arrangement of the partition plates 400. However, if the arrangement of the partition plates 400 is not considered, a larger space may be usually secured towards the outside of the inner washing tub 100. The frying pan or the pot may be accommodated in the receiving space 120 that is arranged adjacent to the outer circumference of the inner washing tub 100, and the cup or the bowl may be accommodated in the receiving space 120 that is arranged inside the receiving space 120 accommodating the frying pan or the pot.

Furthermore, relatively small utensils such as the spoon and chopsticks, the ladle, the slice, or the spatula may be accommodated in a washing box 10. The washing box 10 may be fixedly accommodated in the receiving space 120. The washing box 10 is preferably formed in a mesh structure so that water or food residues are introduced into the washing box 10 or discharged out from the washing box 10 in the washing process. Of course, the washing box 10 may be formed in the shape of a tub that is open at a top thereof, and may be formed in a closed structure while accommodating the spoon and chopsticks, the ladle, and the like.

Here, the dishes and the cooking utensils each having a space to contain food therein, such as a relatively large bowl, cup, pot, or frying pan, are accommodated in the receiving space 120 such that a food side thereof faces the outer circumference of the inner washing tub 100. Such a structure allows the food residues detached from the dishes and the cooking utensils in the washing process and the water used in the washing process to be easily discharged through the perforations 110.

Figure 3:
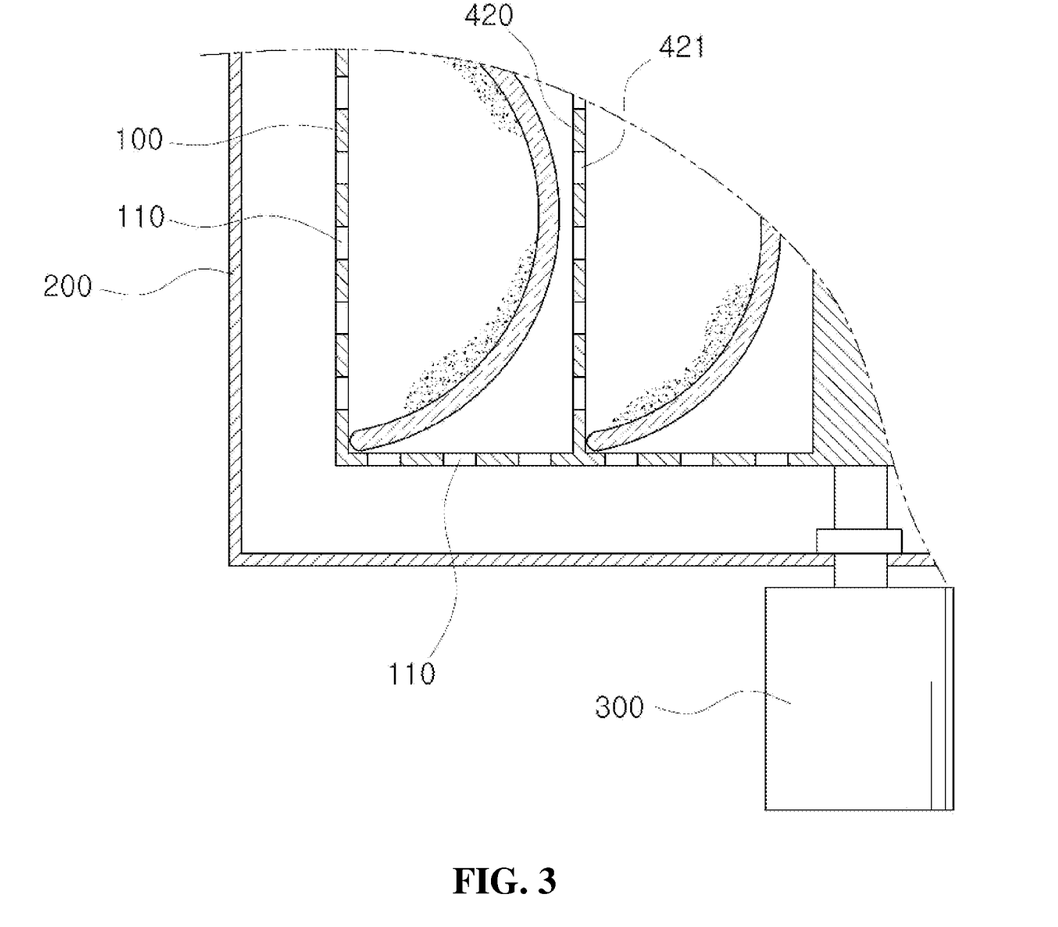
FIGS. 3 and 4 are sectional views illustrating an operation in which food residues are detached from dishes and cooking utensils accommodated in the inner washing tub of the present invention and are discharged to an outer washing tub.
Figure 4:
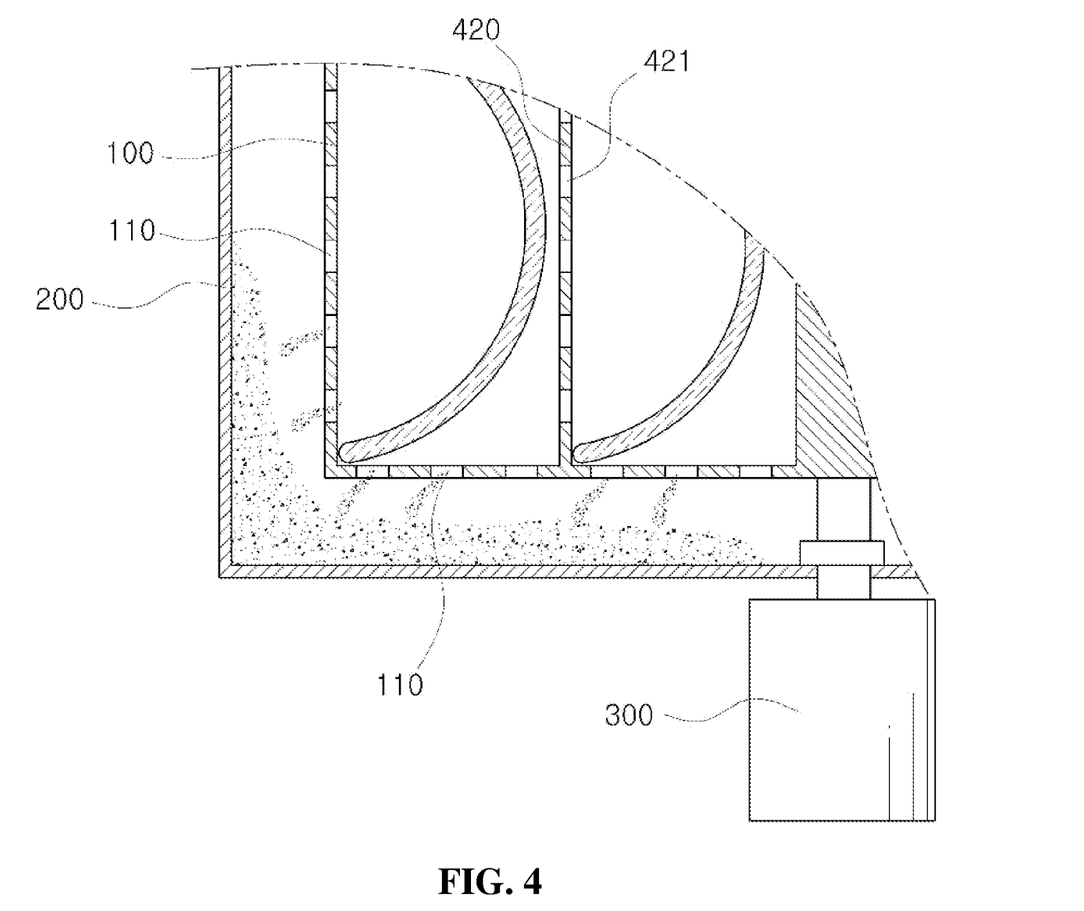

In this way, according to the present invention, as the inner washing tub 100 rotates while accommodating the dishes and the cooking utensils in the receiving space 120 such that the food side faces the outer circumference of the inner washing tub 100, as illustrated in FIGS. 3 and 4, the food residues are detached from the dishes and the cooking utensils by the centrifugal force and the dishes and the cooking utensils are efficiently washed. Therefore, as opposed to the related art, the configuration for generating a high-pressure water current is not required, so that it is possible to produce products at low cost, and the configuration is relatively simple, so that it is possible to produce products having various sizes.

Moreover, the dishes and the cooking utensils are accommodated one by one in each receiving space 120, and each of the inner washing tub 100 and the partition plates 400 is made of a cushioning material, such as rubber, which may absorb shocks and have a relatively large frictional force against the accommodated dishes and cooking utensils. Since the dishes and cooking utensils accommodated in the receiving space 120 are surrounded by the inner washing tub 100 and the partition plate 400 made of the cushioning material, collision does not occur even if the inner washing tub 100 rotates, and damage to the inner washing tub 100 may be prevented due to shocks when the tub is rotated and stopped by the motor 300.

For example, as illustrated in FIGS. 1, 2, 5, and 6, the partition plate 400 defining the receiving space 120 in the inner washing tub 100 includes a plurality of first partition plates 410 that have a plate shape and are provided radially around a center of the inner washing tub 100, and at least one second partition plate 420 having the shape of a tub that is open at a top and a bottom thereof and provided inside the inner washing tub 100. Here, the first and second partition plates 410 and 420 may be connected to the bottom of the inner washing tub 100 and be spaced apart therefrom by a predetermined distance.

The first partition plate 410 may be formed in the shape of a plate extending from the center of the inner washing tub 100 to the outer circumference thereof, or may be formed in the shape of a plate extending from the center of the inner washing tub 100 to an inner circumference of the second partition plate 420, or may be formed in the shape of a plate extending from the outer circumference of the second partition plate 420 to the outer circumference of the inner washing tub 100. Furthermore, a plurality of second partition plates 420 having different diameters may be provided to be spaced apart from each other. The first and second partition plates 410 and 420 may be provided in the inner washing tub 100 in various arrangements.

A distance between the center of the inner washing tub 100 and the second partition plate 420, a distance between the second partition plates 420, and a distance between the second partition plate 420 and the outer circumference of the inner washing tub 100 are preferably formed to be slightly lower than the dishes and the cooking utensils, because each of the dishes and cooking utensils is arranged such that its food side faces the outer circumference of the inner washing tub 100. The distance is set to have the sum of the height of each of the dishes and the cooking utensils and a gap for accommodating the finger that is inserted into the receiving space 120 to take the tightly-fitted dishes and cooking utensils out from the receiving space 120. Thus, the dishes and the cooking utensils accommodated in the receiving spaces 120 are washed in a fixed state without being rotated in the receiving spaces 120, even if the inner washing tub 100 rotates.

Similarly to the inner washing tub 100, a plurality of perforations 411 and 421 is formed through the outer circumferences of the first partition plate 410 and the second partition plate 420. The perforations 411 and 421 allow water to be introduced or discharged through the first partition plate 410 and the second partition plate 420 in the washing process, and allow food residues on the dishes and cooking utensils to be discharged out from the inner washing tub 100.

Figure 5:
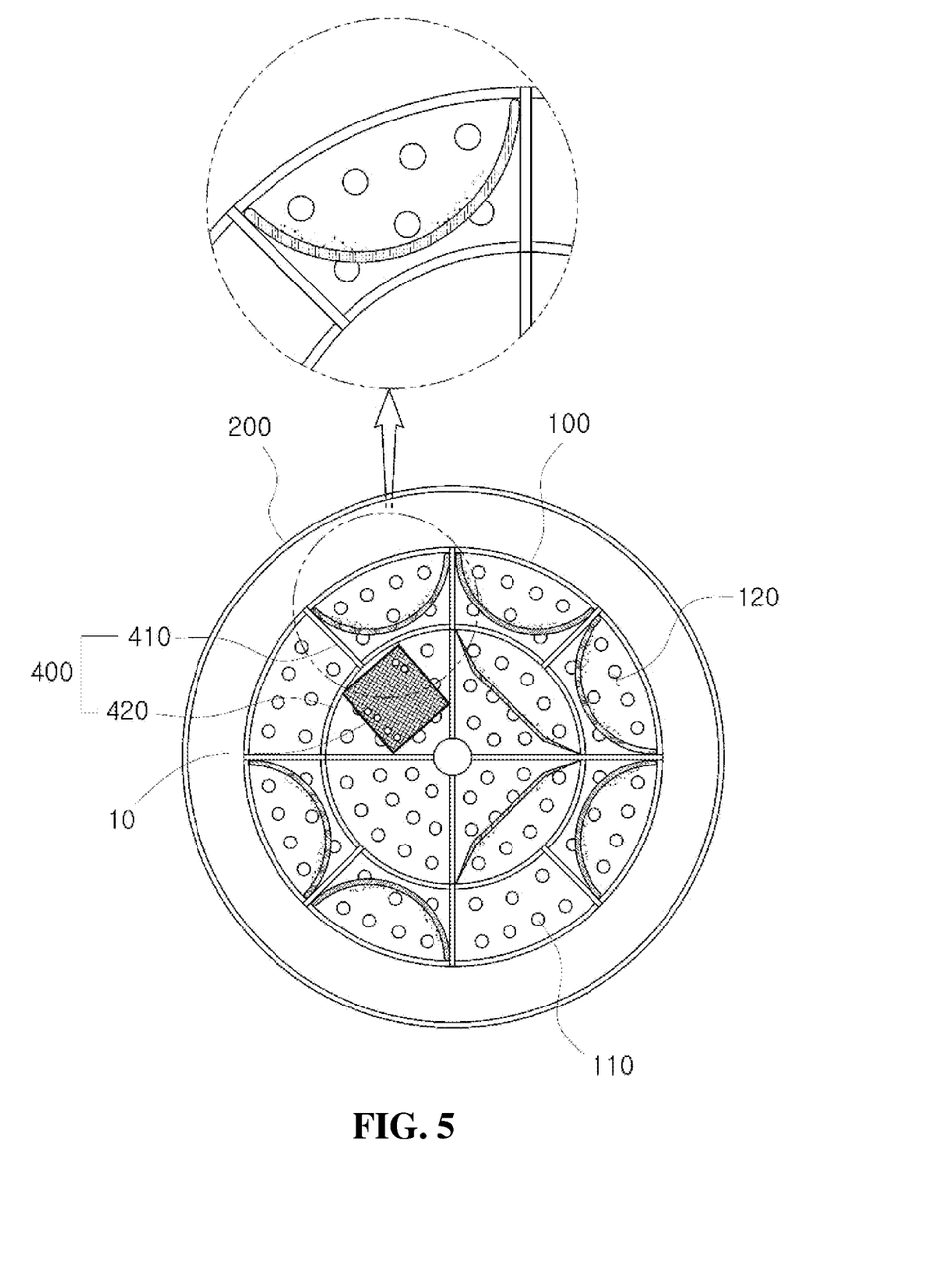
FIG. 5 is a plan view illustrating a structure of an inner washing tub in accordance with an embodiment of the present invention.
Figure 6:
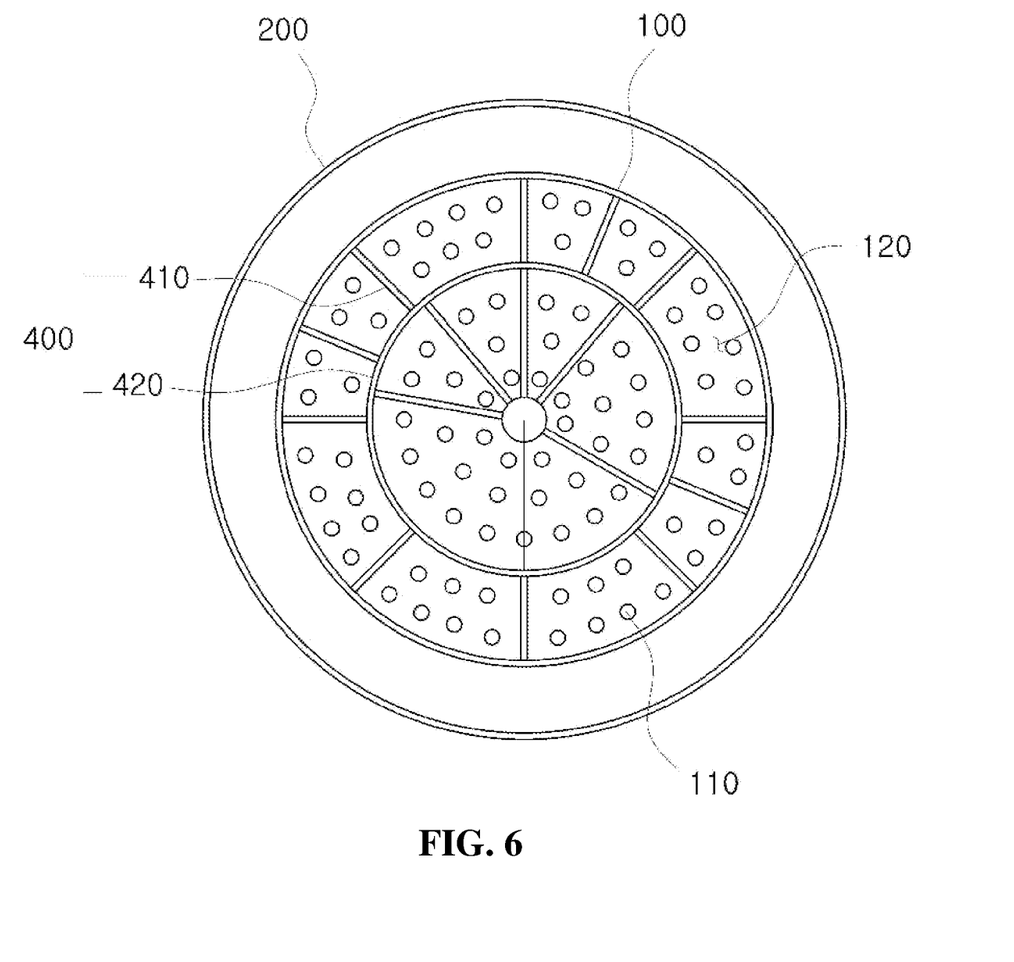
FIG. 6 is a plan view illustrating a structure of an inner washing tub in accordance with another embodiment of the present invention.

As illustrated in FIG. 5, each receiving space 120 defined by the first and second partition plates 410 and 420 may accommodate relatively large dishes and cooking utensils such as bowls, cups, pots, or frying pans through tight fitting, and may also accommodate the washing box 10 that holds relatively small dishes and cooking utensils such as spoon and chopsticks, ladles, slices, or spatulas through tight fitting. Therefore, at least one receiving space 120 may be formed to have a different size.

Furthermore, dishes and cooking utensils dedicated for the dish washer of the present invention may be tightly fitted into the corresponding receiving spaces 120, and each of the dishes and the cooking utensils that are the dedicated products may be accommodated in the receiving space to be washed in the fixed state without being rotated. To this end, the dishes and cooking utensils of the invention form a set with the dish washer. The dishes and cooking utensils are provided together when the dish washer is sold. The dishes and the cooking utensils that are the dedicated products are one of the essential components of the dish washer according to the present invention. Each receiving space 120 is marked with a number to identify a dedicated product that is to be accommodated. For instance, any specific bowl and the receiving space 120 designed to correspond to the size of the bowl are marked with the same number. Thus, a user can easily find the receiving space 120 corresponding to each of the dishes and cooking utensils that are the dedicated products to easily perform a washing operation.

Figure 7:
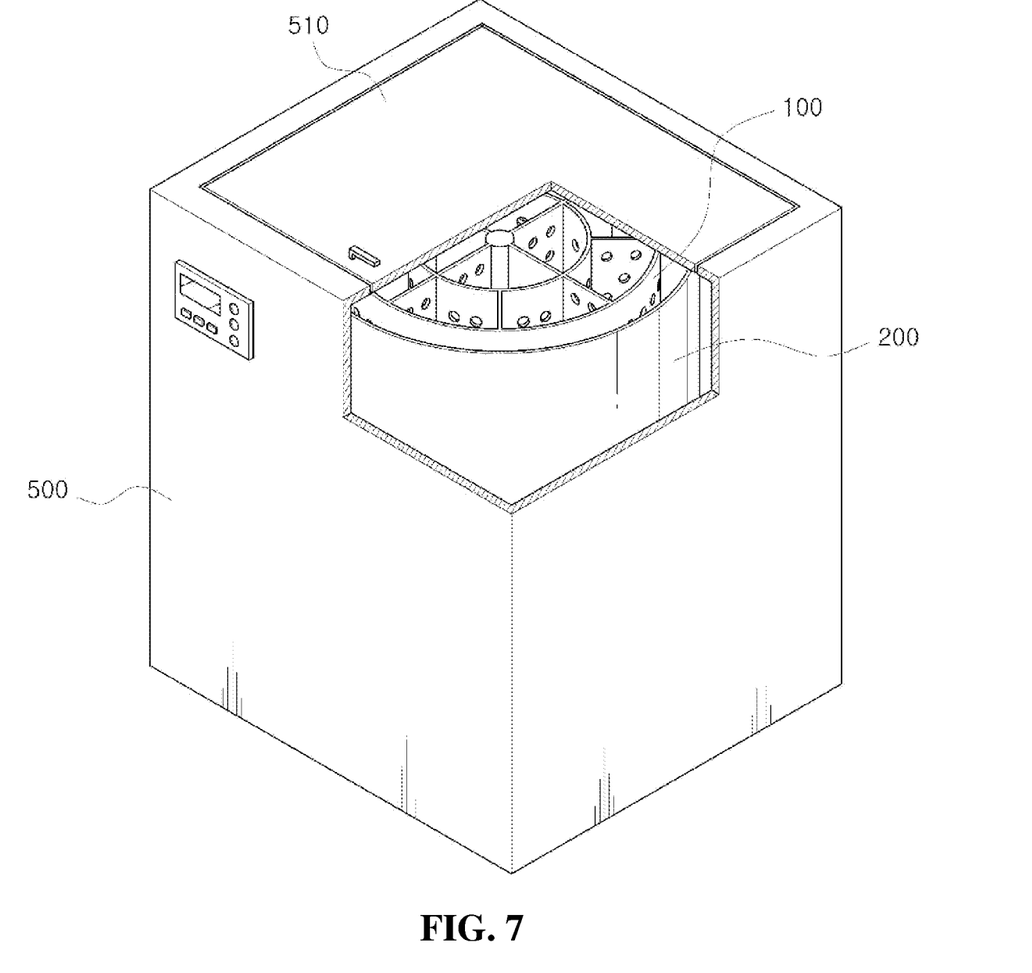
FIG. 7 is a perspective view illustrating a structure of a case applied to the dish washer of the present invention.

Meanwhile, as illustrated in FIG. 7, the dish washer of the present invention may further include a case 500 that is formed in various shapes to surround the outer washing tub 200 and the motor 300. The case 500 may be provided with a door 510 that closes or opens the top of the inner washing tub 100. Therefore, a user opens the door 510 to put the dishes and the cooking utensils into the inner washing tub 100 and then closes the door 510 to perform the washing operation. Thereafter, the door 510 is opened to take the washed dishes and cooking utensils out from the dish washer.

Furthermore, the case 500 may include a display to show a washing state, and a button to select at least one of washing processes or a washing degree. A control module for controlling electronic components included in the dish washer of the present invention may be provided in the case 500.

Figure 8:
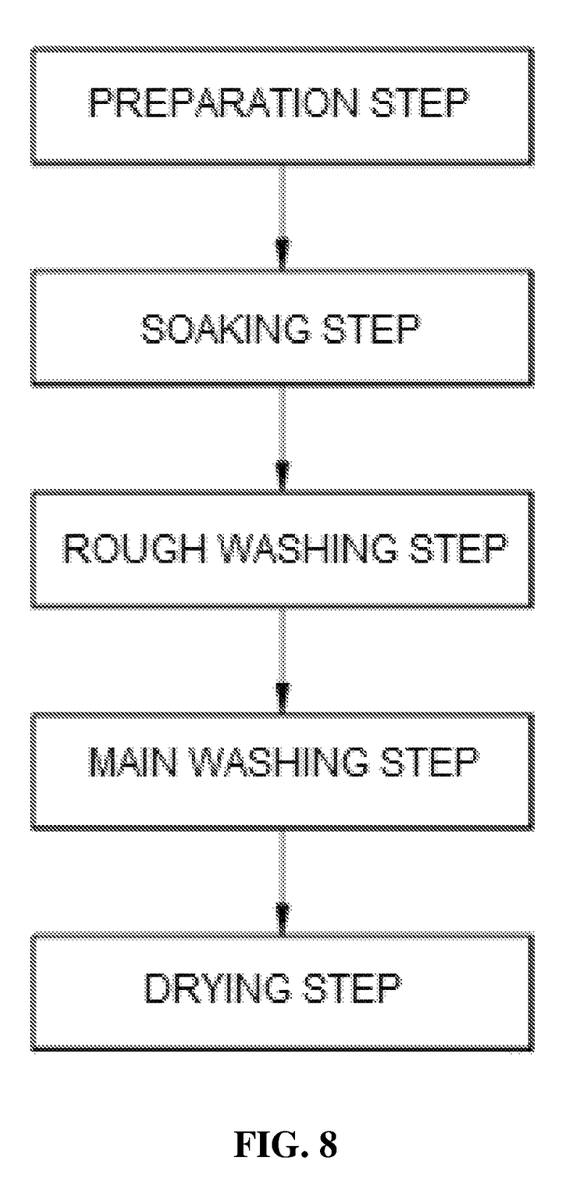
FIG. 8 is a flowchart illustrating a washing method using a dish washer of the present invention.

As illustrated in FIG. 8, the method of washing the dishes and the cooking utensils using the dish washer of the present invention may include a preparation step, a soaking step, a rough washing step, a main washing step, and a drying step.

Figure 9:
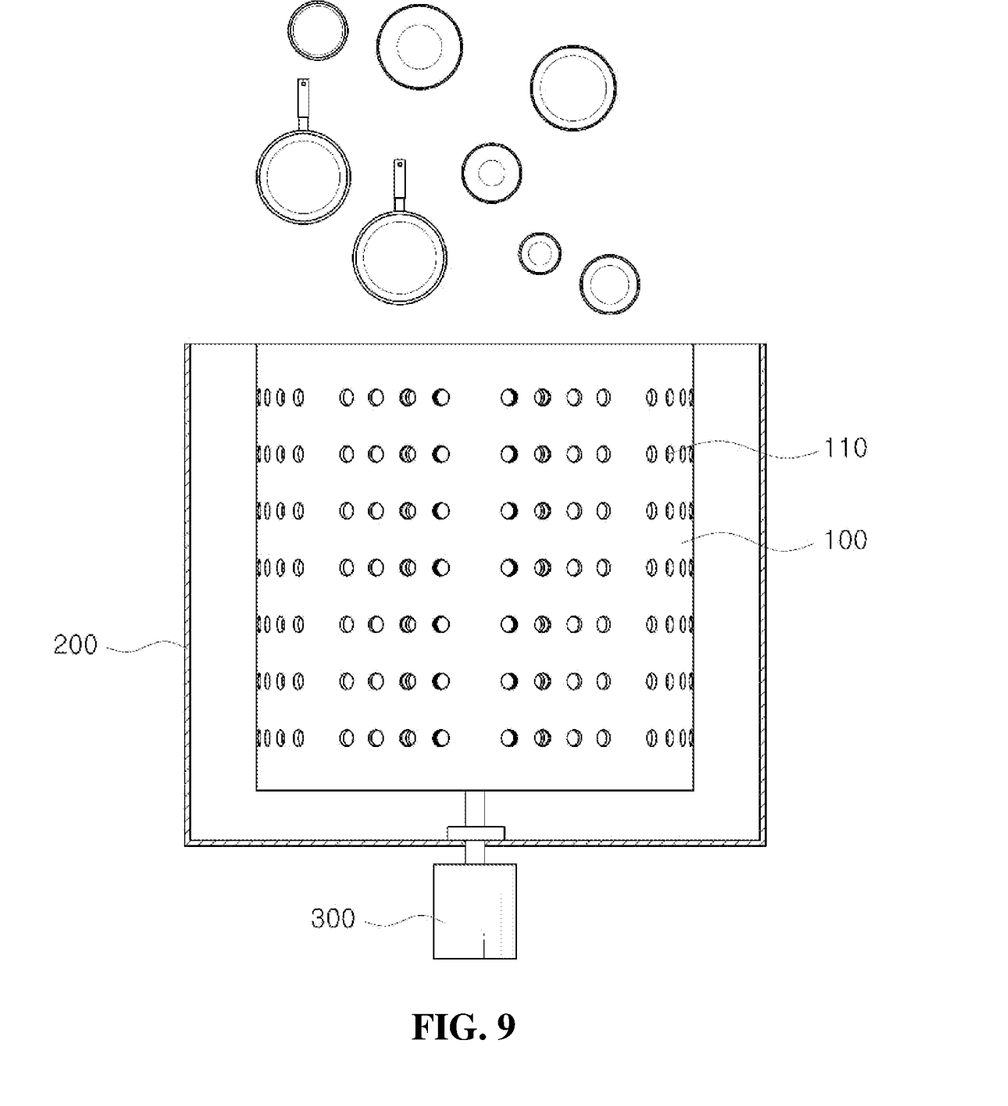
FIGS. 9 to 11 are sectional views illustrating a process of washing dishes and cooking utensils by the washing method using the dish washer of the present invention.

As illustrated in FIG. 9, the preparation step is the step of putting the dishes and the cooking utensils into the receiving space 120 defined in the inner washing tub 100. At this time, as illustrated in FIG. 5, one the dishes and the cooking utensils is accommodated in each receiving space 120 such that its food side faces the outer circumference of the inner washing tub 100. At this time, the inner washing tub 100 has no water for washing the dishes and the cooking utensils.

Figure 10:
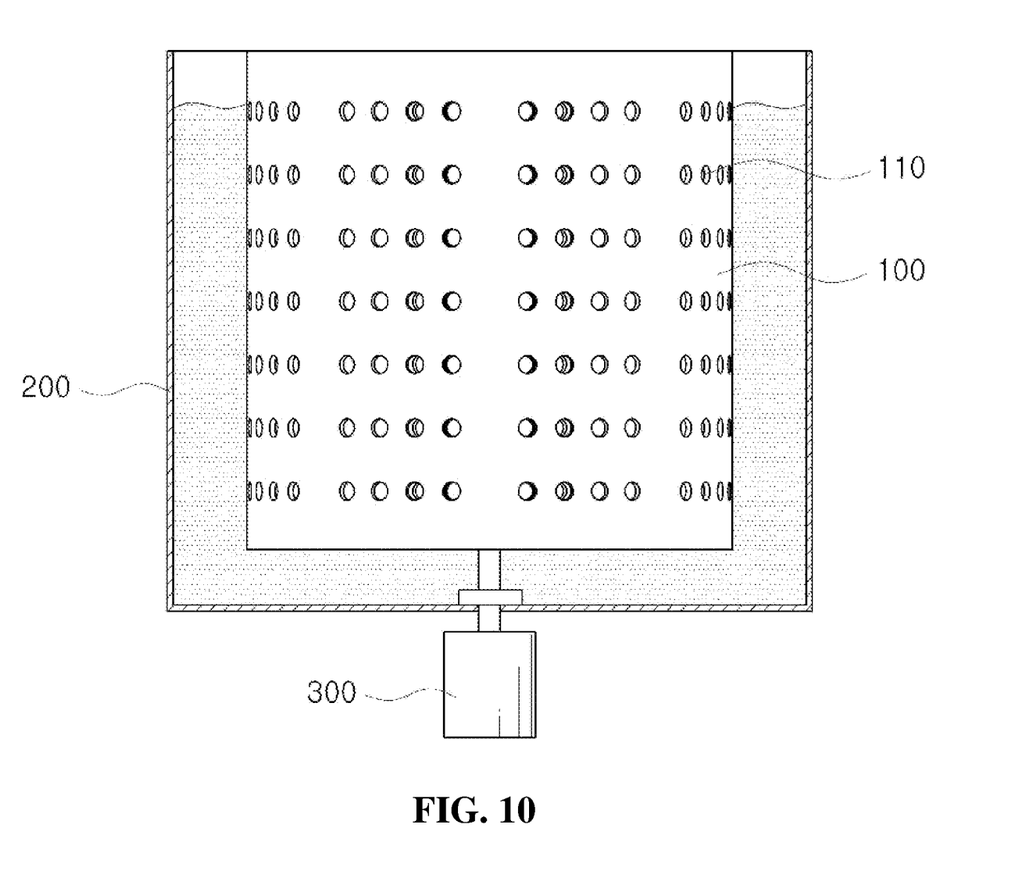

As illustrated in FIG. 10, at the soaking step, water is fed into the outer washing tub 200 to soak the dishes and the cooking utensils in water contained in the receiving space 120. Preferably, water used in the dish washer is warm or hot water. In other words, the dishes and the cooking utensils are soaked in hot water for a predetermined period of time, thus allowing food residues to be easily detached from the dishes and cooking utensils in a subsequent step.

Figure 11:
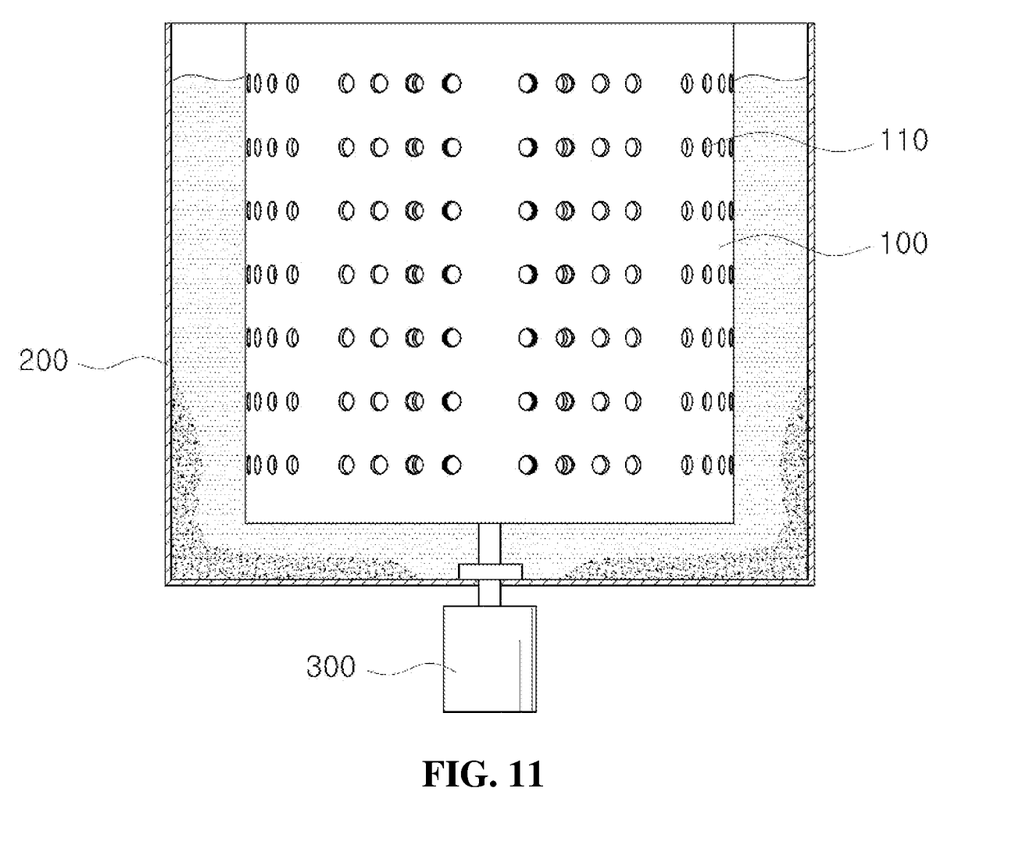

At the rough washing step, the inner washing tub 100 rotates leftwards or rightwards, so that the soaked food residues are primarily detached from the dishes and cooking utensils by the centrifugal force, as illustrated in FIG. 11. After the inner washing tub 100 is rotated for a predetermined period of time, hot water accommodated in the outer washing tub 200 is discharged, and the primarily detached food residues as well as the hot water are discharged.

The main washing step is the step of mainly washing the dishes and the cooking utensils from which the food residues are primarily detached. First, washing water containing detergent and water is fed into the outer washing tub 200 to cause the dishes and the cooking utensils accommodated in the receiving space 120 to be soaked in the washing water. Here, the detergent and the water may be separately supplied. In addition, the detergent and the water may be supplied through separate paths. Next, the inner washing tub 100 is rotated leftwards or rightwards to secondarily detach the food residues from the dishes and the cooking utensils soaked in the washing water by the centrifugal force and thereby wash the dishes and washing utensils. After the washing operation has been performed for a predetermined period of time by the centrifugal force, the washing water is discharged.

At the drying step, clean and fresh rinsing water is supplied to and filled in the outer washing tub 200, so that the dishes and the cooking utensils in the receiving space 120 are soaked in the rinsing water and then the inner washing tub 100 is rotated leftwards or rightwards for a predetermined period of time. Thereby, the food residues and the detergent are completely removed from the dishes and the cooking utensils and the rinsing water is discharged. Finally, the inner washing tub 100 rotates at high speed, so that dirt and water are detached from the dishes and the cooking utensils and simultaneously the drying operation is performed by the centrifugal force.

What is claimed is:

1. A dish washer set comprising:
   a dish washer including:
   an inner washing tub that is open at a top thereof and has a plurality of receiving spaces to accommodate dishes and cooking utensils therein, with a plurality of perforations being formed throughout an outer circumference and a bottom of the inner washing tub;
   an outer washing tub provided to surround the inner washing tub; and
   a motor rotating the inner washing tub leftwards or rightwards; and
   a plurality of dishes and cooking utensils forming one set with the dish washer, dedicated for the dish washer, and each having a size to be fitted into each receiving space, each of the dishes and cooking utensils being accommodated in each receiving space and washed in a fixed state,
   wherein each receiving space is designed to correspond to a size of each of the dishes and cooking utensils and accommodate one of the dishes and cooking utensils, thus preventing the dishes and the cooking utensils from colliding with each other in a washing operation and separating the dishes and the cooking utensils by a partition plate, each of the inner washing tub and the partition plate is made of a cushioning material, and the inner washing tub rotates while accommodating each of the dishes and the cooking utensils in each receiving space such that a food side thereof faces an outer circumference of the inner washing tub, so that food residues are discharged to an outside of the inner washing tub by a centrifugal force,
   wherein the partition plate comprises a plurality of first partition plates that have a plate shape and are provided radially around a center of the inner washing tub, and at least one second partition plate having a shape of a tub that is open at a top and a bottom thereof and provided inside the inner washing tub, and
   wherein a plurality of perforations is formed through outer circumferences of the first partition plate and the second partition plate, and each of the dishes and cooking utensils is accommodated through fitting in each receiving space defined by the first partition plate and the second partition plate.

2. The dish washer of claim 1, further comprising:
   a washing box having a mesh structure and accommodating spoons and chopsticks, ladles, slices, and spatulas therein,
   wherein the washing box is accommodated in the receiving space through fitting.

3. The dish washer of claim 1, wherein a gap is formed between an inner wall of the receiving space and each of the dishes and the cooking utensils held in the receiving space through fitting, thus allowing each of the dishes and the cooking utensils to be put into or taken out from the receiving space by inserting a finger into the gap, and
   wherein each of the dishes and cooking utensils and each of the receiving spaces are marked with numbers, and a specific dish or cooking utensil and a receiving space for accommodating the specific dish or cooking utensil are marked with the same number.

4. A washing method using the dish washer set of claim 1, the method comprising:
   a preparation step of accommodating and holding one of the dishes and cooking utensils into each of the plurality of receiving spaces such that the food side thereof faces the outer circumference of the inner washing tub;
   a soaking step of supplying hot water into the outer washing tub to soak each of the dishes and the cooking utensils accommodated in the receiving space in the hot water for a predetermined period of time to thereby detach the food residues from each of the dishes and the cooking utensils;
   a rough washing step of rotating the inner washing tub leftwards or rightwards to primarily separate the food residues from each of the dishes and the cooking utensils by the centrifugal force, and then discharging the hot water;
   a main washing step of supplying washing water containing detergent and water into the outer washing tub to cause each of the dishes and the cooking utensils accommodated in each of the receiving spaces to be soaked in the washing water, and then rotating the inner washing tub leftwards or rightwards to secondarily detach the food residues from each of the dishes and the cooking utensils by the centrifugal force and thereby washing each of the dishes and washing utensils, and then discharging the washing water; and a drying step of supplying and filling clean and fresh rinsing water in the outer washing tub, rotating the inner washing tub leftwards or rightwards for a predetermined period of time to remove the food residues and the detergent from each of the dishes and the cooking utensils, discharging the rinsing water, and then rotating the inner washing tub to remove remaining dirt and water from each of the dishes and the cooking utensils by the centrifugal force.

\* \* \* \* \*